United States Patent Office 3,208,932
Patented Sept. 28, 1965

3,208,932
PRODUCTION OF PARAFFIN WAX
John Welford Hyde, London, England, assignor to The British Petroleum Company Limited, London, England, a joint-stock corporation of Great Britain
No Drawing. Filed Aug. 14, 1962, Ser. No. 216,753
8 Claims. (Cl. 208—28)

This invention relates to the production of paraffin wax.

Various processes are known for the separation of paraffin wax from hydrocarbon mixtures and such wax separation processes are commonly employed in the production of lubricating oils from petroleum feedstocks.

It has now been found that the quality of the wax may be improved if the hydrocarbon mixture, prior to the separation of the wax, is subjected to a mild hydrogenation treatment.

According to the invention, therefore, there is provided a process for the production of paraffin wax from hydrocarbon mixtures, particularly hydrocarbon mixtures of petroleum origin, in which a wax-containing hydrocarbon mixture is subjected to mild catalytic hydrogenation prior to the removal of the wax therefrom.

The mild hydrogenation treatment may be carried out using any conventional sulphur-resistant hydrogenation catalyst and is preferably carried out within the following ranges of conditions.

Temperature _____ 150 to 340° C., preferably 250 to 320° C.
Pressure _____ 5 to 80 ats., preferably 20 to 30 ats.
Hydrogen flow rate _____ 5 to 150 vols. per vol. of oil.
Space velocity of oil _____ 0.5 to 6 v./v./hr.

A particularly effective catalyst for the purposes of the present invention is one comprising the oxides of iron, cobalt and molybdenum incorporated with a support, preferably a metal oxide support, the preferred support being activated alumina.

The preferred composition of the catalyst by weight is

|  | Percent |
|---|---|
| Molybdenum oxide $MoO_3$ | 10 to 11 |
| Cobalt oxide CoO | 3.3 to 3.7 |
| Iron oxide $Fe_2O_3$ | 14 to 15 |
| Alumina, balance. | |

The catalyst may be prepared in any convenient manner but it has been found advantageous to impregnate the support with a solution of an iron salt, such as ferric nitrate, which decomposes on heating to yield the oxide, before the incorporation of the oxides of cobalt and molybdenum.

The dewaxing of the hydrogenated oil may be carried out by any of the conventional solvent dewaxing processes in which the wax is separated as a solid after crystallisation from the oil solution. A particularly suitable solvent is a mixture of methyl isobutyl ketone and methyl ethyl ketone.

The invention will now be illustrated with reference to the following example.

A Kuwait distillate having the properties set out in the following table was divided into two batches and one batch was hydrogenated under the following conditions:

Temperature _____° C__ 275
Pressure _____kgs./cm.²__ 25
Space velocity of the oil _____v./v./hr__ 1
Hydrogen flow rate at standard conditions
 vol./vol. of oil__ 25

The catalyst employed had the following composition by weight:

|  | Percent |
|---|---|
| Molybdenum oxide, $MoO_3$ | 11 |
| Cobalt oxide, CoO | 3.4 |
| Iron oxide, $Fe_2O_3$ | 14 |
| Alumina, balance to 100%. | |

Dewaxing of both batches of oil, i.e., hydrogenated and non-hydrogenated, was carried out on a rotary filter under the following conditions:

Solvent:
 Methyl isobutyl ketone ____percent volume__ 90
 Methyl ethyl ketone _____percent volume__ 10
Dilution—2 vols solvent per vol of oil.
Temperature of the oil and solvent mixture __° C__ 50
Temperature of the refrigerating bath _____° C__ −35
Temperature of filtration _____° C__ −25
Filtration cycle:
 Filtration time _____seconds__ 36
 Drying _____do____ 10
 Washing _____do____ 16
 Drying _____do____ 5
 Lost time _____do____ 9
 Length of cycle _____do____ 76

The results obtained are set out in the following table.

|  | Crude Distillate | | Hydrogenated Distillate | |
|---|---|---|---|---|
|  | Before Dewaxing | After Dewaxing | Before Dewaxing | After Dewaxing |
| Yield of oil, wt. percent | | 87 | | 88 |
| Density at 15° C | 0.899 | | 0.898 | |
| Viscosity, Centistokes at 50° C | 12.71 | | 12.44 | |
| Viscosity, Centistokes at 100° C | 3.77 | | 3.74 | |
| Refractive Index, 20°/D | 1.5019 | | 1.4619 | |
| Pour Point, ° C | +21 | −24 | +21 | −24 |
| Colour of wax | | Yellow | | White |

The hydrogenation therefore had the effect of increasing very slightly the yield of oil after dewaxing and more particularly enabled a wax to be produced that was perfectly white and required no subsequent decolourising treatment.

I claim:

1. A process for the production of white paraffin wax from wax-containing hydrocarbon oils comprising subjecting the wax-containing hydrocarbon oil to a mild catalytic hydrogenation treatment at a temperature of from 150 to 340° C., and a pressure of from 5 to 80 ats., said catalyst comprising the oxides of iron, cobalt, and molybdenum incorporated with a support, subjecting the resulting hydrogenated oil to a dewaxing operation and recovering a white wax therefrom requiring no subsequent decolorization treatment.

2. A process according to claim 1, wherein the temperature is within the range 250 to 320° C.

3. A process according to claim 1, wherein the pressure is within the range 20 to 30 ats.

4. A process according to claim 1, wherein the hydrogen flow rate is within the range 5 to 150 vols. of hydrogen per vol. of oil.

5. A process according to claim 1, wherein the space velocity of the oil is within the range 0.5 to 6 volumes of oil per volume of catalyst per hour.

6. A process according to claim 1, wherein the catalyst has a metal oxide support.

7. A process according to claim 6, wherein the support consists of activated alumina.

8. A process according to claim 7, wherein the catalyst has the following composition by weight:

| | Percent |
|---|---|
| Molybdenum oxide, $MoO_3$ | 10 to 11 |
| Cobalt oxide, CoO | 3.3 to 3.7 |
| Iron oxide, $Fe_2O_3$ | 14 to 15 |
| Alumina, balance to 100%. | |

References Cited by the Examiner

UNITED STATES PATENTS

| | | | |
|---|---|---|---|
| 2,712,518 | 7/55 | Vaughn | 208—28 |
| 2,904,505 | 9/59 | Cole | 208—28 |
| 2,917,448 | 12/59 | Beuther et al. | 208—264 |
| 3,078,222 | 2/63 | Henke | 208—25 |

PAUL M. COUGHLAN, *Primary Examiner.*

JOSEPH R. LIBERMAN, ALPHONSO D. SULLIVAN, *Examiners.*